Patented Oct. 4, 1932

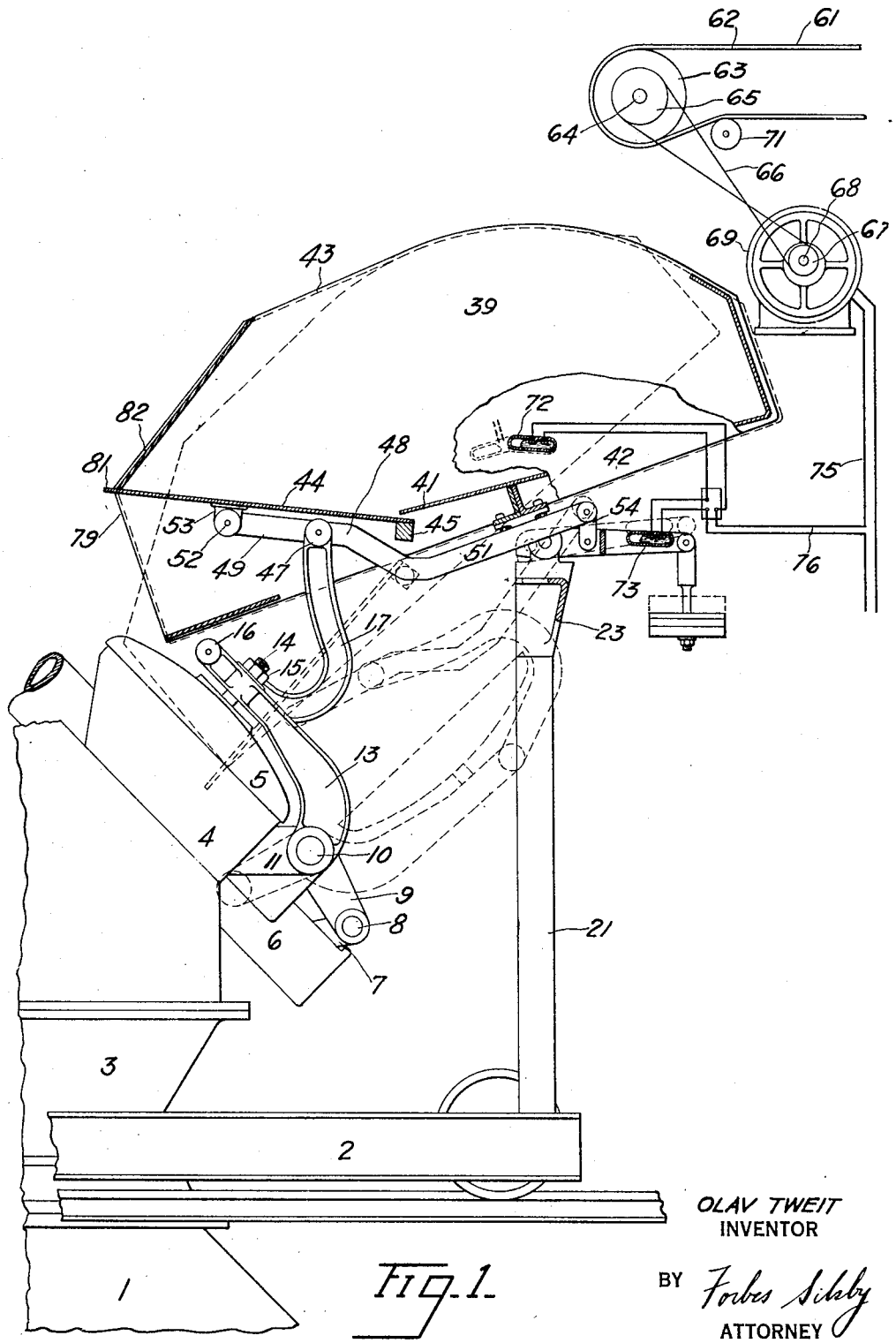

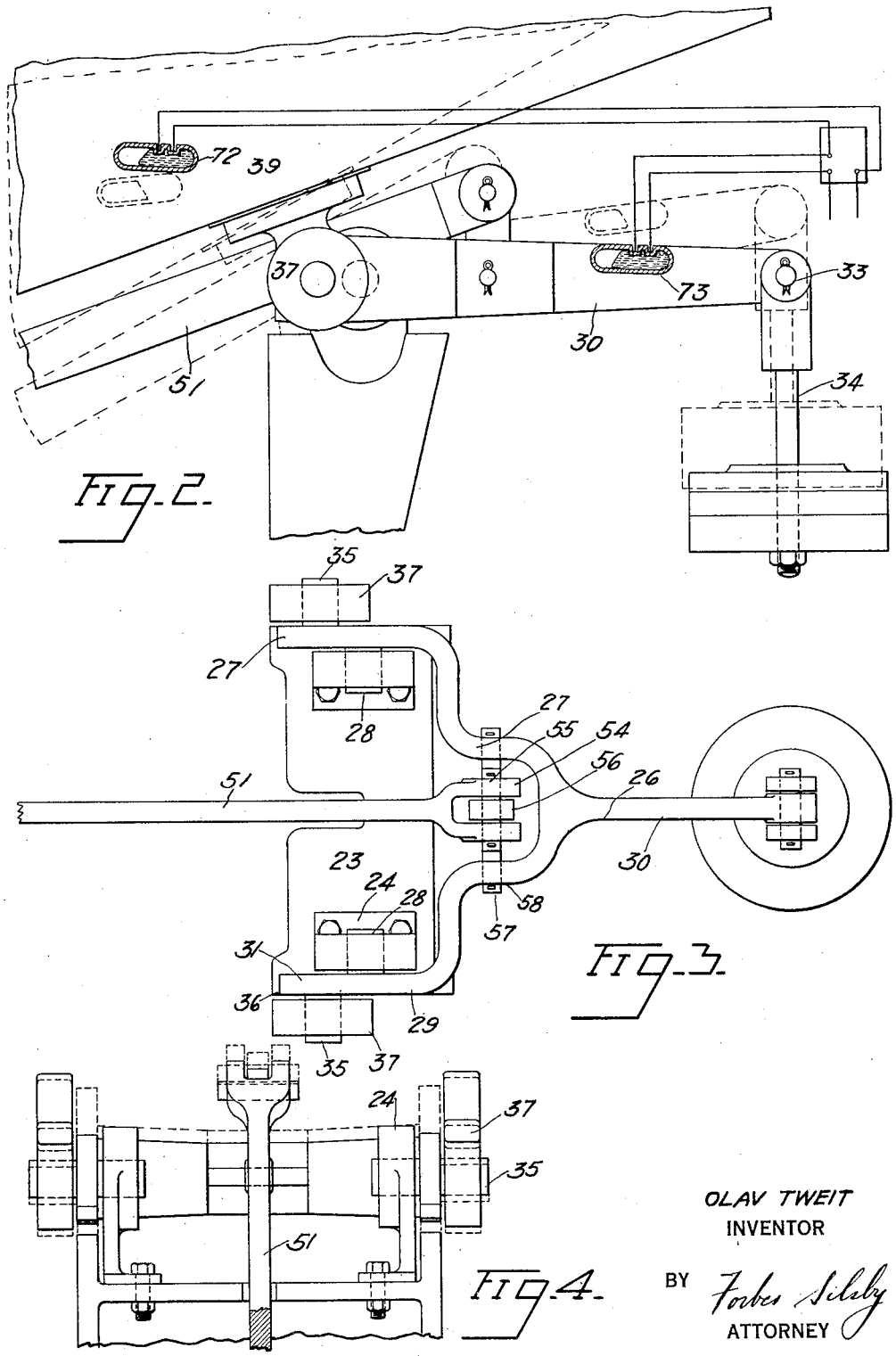

1,880,597

UNITED STATES PATENT OFFICE

OLAV TWEIT, OF ORANGE, NEW JERSEY, ASSIGNOR TO SEMET-SOLVAY ENGINEERING CORPORATION, OF NEW YORK, N. Y., A CORPORATION OF NEW YORK

SCALE FOR CHARGING MACHINES

Application filed August 1, 1928. Serial No. 296,789.

This invention relates to a balance or scale device, and more particularly to a fuel weighing device for a charging machine such as disclosed in the patent to George R. Steere No. 1,608,680, of November 30, 1926. While I have shown and described as a preferred embodiment of my invention a fuel feeding device for a charging machine of a gas generator, it will be understood that this invention is not limited thereto but may be used in connection with any balance or scale device.

One object of the present invention is to provide a balance adapted for use in a charging machine that is of simple and rugged construction and efficient in operation. Another object is to provide a scale or balance that includes means to compensate for uneven distribution of material in the container or scale pan of the balance and that is, therefore, substantially accurate irrespective of the distribution of material in the container.

In the usual balance device a container or scale pan is mounted in counter-balance relation with a weight lever and weight platform secured to the lever. The container or scale pan of many machines involving weighing devices, as for example the hopper of a charging machine, is often of considerable size and if the charge is not evenly distributed in the container, i. e., to affect the weights on the weight platform proportionately to the mass thereof, the balance obviously will not function to accurately weigh the charge.

According to a preferred embodiment of this invention, there is provided a weight lever pivoted in bearing supports intermediate the ends thereof so as to form a lever of the first kind, the pivotal supports serving as the fulcrum for the weight lever. Secured to the long arm of the lever is a weight platform arranged to detachably receive suitable weights. A container or scalepan is preferably mounted on the end of the short arm of the weight lever in counter-balance relation to the long arm and weight platform. A second lever is pivotally mounted on a suitable support so as to form arms of unequal length, the short arm being preferably fastened to a gate or flapper pivotally mounted in the sides of the container. The long arm of this second lever is connected to the long arm of the weight lever at a particular point so that the distance between this point and the fulcrum of the weight lever is to the length of the short arm of the weight lever as the long arm is to the short arm of the second lever.

In this construction the charge distributed on the base of the container over the support therefor, as usual, is counter-balanced against the weights placed on the weight platform. Also, if the material is unevenly distributed in the container, which is often the case due to the indiscriminate feed of the material usually employed, that portion of the material positioned at the front portion of the container over the flapper or gate therein in the usual scale would not affect the weight on the weight platform proportionately to its mass. According to this invention, however, due to the second lever having its short arm pivoted to the gate in the container and the long arm connected to a particular point on the long arm of the weight lever, as above described, the material positioned over the gate in the container affects the weights on the weight platform in proportion to its mass. It has been found in commercial practice, that a scale constructed as herein described yields substantially accurate and improved results as compared with the results obtained from scales constructed in accordance with prior practice.

Accordingly, this invention comprises a container in counter-balance relation with a weight lever and associated with this lever so as to compensate for uneven distribution of material therein.

Other objects and advantages will appear from the following detailed description taken in connection with the accompanying drawings, in which—

Fig. 1 is a fragmentary side elevation, partly in section, of a charging machine showing a portion of the top of the generator, the hopper of the charging machine being broken away to show the interior construction thereof and illustrating a preferred embodiment of my invention;

Fig. 2 is a fragmentary side elevational detail on an enlarged scale showing the mounting for the hopper and weight lever;

Fig. 3 is a fragmentary plan view on an enlarged scale of the mounting for the weight lever and hopper; and Fig. 4 is a front elevational detail showing the mounting of the weight lever and hopper supports.

Referring to the drawings wherein 1 indicates the top portion of a combustible gas generating machine such as a water gas generator, 2 indicates the frame of the charging machine, preferably such as disclosed in the Steere patent hereinbefore mentioned, in charging position over the charging opening of the generator 1. The charging machine comprises a magazine 3, fragmentarily shown, provided with a fuel nozzle 4 having a cover 5 adapted to serve as a closure for the nozzle 4. The cover 5 is moved into open and closed positions by the hydraulic motor or cylinder 6 through link 7 bolted or otherwise fastened to the piston rod (not shown) of the cylinder 6. The link 7 is pivoted at 8 to a lever 9 which is keyed or otherwise fastened to shaft 10 supported in brackets 11 secured to the charging machine. A lever 13 is keyed to shaft 10 and is secured by a nut 15 to a pin 14 integral with or fastened to the cover 5. Pivoted at 16 to the lever 13 is a curved lever 17, the function of which will be hereinafter explained.

Standards 21 are bolted or otherwise fastened to the frame 2 of the charging machine and are provided at the top with a cross-bar 23. Bearings 24 are preferably bolted to the ends of the cross-bar 23. A weight lever or scale beam 26 has a substantially U-shaped end 27 provided with pins or projections 28 preferably formed integral with the arms 29 of the U-shaped end 27. The pins 28 are rotatably mounted in the bearings 24 and are so positioned on the lever 26 as to divide the lever into a long arm 30 and a short arm 31. Pivotally secured at 33 to the extreme end of the long arm 30 is a weight platform 34 arranged to detachably receive suitable weights.

Projections or pins 35 are preferably formed integral with the ends 36 of the short arm 31 and extend in an opposite direction from projections 28. Supporting arms 37 are loosely and rotatably mounted on the pins 35 and are bolted or otherwise secured to the base or sides of a hopper or scale pan 39. The hopper 39 is formed with a base plate 41, side plates 42, 43 and a flapper or gate 44 pivotally mounted at 45 in the side plates 42, 43.

The hopper 39 and supporting arms 37 are so positioned on pins 35 of the short arm 31 with respect to the long arm 30 of the weight lever 26 fulcrumed about the pivotal mounting of pins 28 in bearings 24, that the hopper and supporting arms counter-balance the long arm 30 of the weight lever 26 and weight platform 34 about the fulcrum formed by the mounting of pins 28 in bearings 24.

Pivoted at 47 (Fig. 1) to the curved lever 17 is a lever 48 of suitable dimensions to provide a short arm 49 and a long arm 51. The short arm 49 is pivotally connected at 52 to a bracket 53 bolted or otherwise secured to the flapper or gate 44. The long arm has a U-shaped portion 54 in which is mounted a pin 55. A link 56 has one end pivoted on pin 55 and the other end pivotally connected with a pin or connecting rod 57 bolted or otherwise fastened at 58 to the long arm 30 of weight lever 26. Point 58 at which the long arm 51 is fastened to the long arm 30 of the weight lever 20 is preferably positioned so that the distance between this point and the fulcrum 28 is to the length of the short arm 31 as the length of the long arm 51 is to the length of the short arm 49.

A conveyor 61 (Fig. 1) is suitably positioned to deliver material such as fuel to the hopper 39 of the charging machine. The conveyor belt 62 passes over a pulley 63 keyed or otherwise secured to a shaft 64 suitably journaled above the hopper 39. Shaft 64 has keyed thereto a pulley 65 over which passes a belt 66 which also passes over a pulley 67 secured to the armature shaft 68 of the motor 69. A usual belt tensioning device 71 is provided for maintaining the conveyor belt 62 taut. The conveyor 61 discharges the material into the hopper 39 so that the material is indiscriminately distributed therein.

A mercury switch 72 is mounted on the side 42 of the hopper 39 and a second mercury switch 73 is positioned on the long arm of the weight lever 26. The mercury switches 72 and 73 are connected in series to the motor circuit 75 by electric conductors 76. The circuit 75 is in turn connected to a suitable source of power.

In operation, when a predetermined charge has been delivered to the hopper 39 in full line position (Fig. 1) which is the position for receiving the charge from the conveyor 61, the hopper and charge overbalance the weight lever, weight platform and weights on the latter equivalent to the weight of the predetermined charge. Accordingly, the weight lever is rocked about the pivotal support 28, the long arm 30 moving upward (Fig. 2) and the short arm 31 and the container moving downward as shown from the full to the dotted line positions. The elevation of the weight lever causes the mercury in switch 73 to flow toward the left thereby opening the switch and the circuit to the motor thus de-energizing and stopping the motor and consequently interrupting the feed of material by the conveyor 61 to the hopper 39.

The hopper is maintained in the full line position indicated in Fig. 1 by the support provided by lever 17, through lever 48, the short arm of which is connected to gate 44 of the hopper and the long arm 51 of which is connected to long arm 30 of the weight lever. Upon operation of the hydraulic cylinder or motor 6, at predetermined time intervals, by the admission and discharge of pressure fluid, in accordance with usual practice of operating such cylinders, as disclosed, for example, in the aforementioned Steere patent, lever 17 is moved downwardly, as indicated in dotted lines, permitting the hopper to pivot about points 35 and follow the downward movement of the lever 17. Hydraulic cylinder 6, through levers 7, 9, and 13, opens cover 5 simultaneously with the downward movement of lever 17. As the hopper moves into the dotted line position (Fig. 1), the cover moves toward the open position shown in dotted lines (Fig. 1) so that the curved lever 17 moves toward the right and the gate 44 and hopper 39 are rocked downwardly and as there is no relative movement between lever 17 and the gate 44 the gate is maintained in closed position. When the hopper moves into the fuel nozzle 4 against this nozzle or a stop therein so that further movement is prevented, continued movement of the cover toward the right (Fig. 1) causes lever 17 through lever 49 and bracket 53 secured to gate 44 to swing the gate 44 about its pivotal mounting 45, permitting the fuel to flow into the magazine 3. Movement of the cover 5 into closed position first causes curved lever 17 to swing the gate 44 into position so that the protruding end 81 engages top stop 82 integral with or secured to the sides of the magazine and continued movement of the cover swings the hopper about its pivotal support 35 into full line loading position.

The above described downward movement of hopper 39 causes the mercury in switch 72 to flow toward the left thereby opening switch 72. Accordingly, when the fuel is discharged from the hopper 39 and the weight lever 26 moves back to full line position (Figs. 1 and 2) closing the switch 73, the motor 68 is not energized as the circuit, due to the open switch 72, remains incomplete. The return of the hopper into fuel receiving position closes the switch 72 which completes the circuit to the electric motor 68, energizing the motor which drives the conveyor belt 62 through the pulleys 64 and 67 and connecting belt 66 and an additional charge is then fed to the hopper 39.

It will be noted that since the container is supported on the short arm 31 of the weight lever 26 fulcrumed at 28, the material over the pivotal support 38 of the container is in counter-balance relation with the weights on the weight platform. Also, due to the lever or scale beam 51 secured at 52 to the bracket 53 on the flapper or gate 44 and connected at 58 to the long arm of the weight lever 26, the material distributed on the flapper causes the short arm 49 to move downwardly, the long arm 51 to move upwardly exerting an upward thrust on the long arm 30 of the weight lever 26 which is counter-balanced by the thrust exerted by the weights on the weight platform.

For commercial practice a balance has been constructed wherein the length of the short arm of the lever 51 was 9½" and the length of the long arm of this lever was 28½". The effective length of the long arm of the weight lever was 15" and the effective length of the short arm was 1½". The long arm of the lever was secured to the long arm of the weight lever at a point 4½" away from the fulcrum of the weight lever so that the distance between this point and the fulcrum was three times the length of the short arm of the weight lever which was the proportion existing between the length of the long arm of the lever 51 and the length of the short arm. It is understood, of course, that the dimensions given herein are merely illustrative of one construction of a balance and that a scale or balance of any desired dimensions could be built but, preferably, the relative relation between the length of the long arm and the length of the short arm of the second mentioned lever is maintained the same as the relation of the distance between the point where the long arm of this lever is secured to the long arm of the weight lever and the fulcrum for the weight lever to the length of the short arm of the weight lever.

It will be noted that there is thus provided a balance of simple and rugged construction that is adapted for use in a charging machine. Also, this balance is provided with means to compensate for uneven distribution of material in the hopper or scale pan and is, therefore, substantially accurate irrespective of the distribution of material in the hopper.

While one specific embodiment of the invention is shown and described, it will be understood that this invention is not limited to the structure described, as various changes in the details thereof may be made by those skilled in the art and the invention is not to be limited to the structure described but only by the scope of the appended claims.

I claim:

1. In a balance, a support, a lever of the first kind with unequal arms pivotally mounted in said support so that said support serves as the fulcrum for said lever, a weight platform connected to the end of the long arm, a container arranged to receive material and connected to the end of the short arm, said container having a moving part arranged to support some of the material in said container, a second support, a second lever pivoted on said second support so as to provide arms of unequal length, said second lever having one arm connected to said moving part and the other arm connected to the long arm of said first mentioned lever.

2. In a balance, a support, a weight lever pivoted in said support, a weight platform at one end of said weight lever, a container at the other end of said weight lever for receiving a charge of material, said container having a moving part arranged to support some of the material in said container, and means connecting said moving part with said weight lever to compensate for uneven distribution of material in said container.

3. In a balance, a support, a weight lever of the first kind with unequal arms pivotally mounted in said support so that said support serves as the fulcrum for said lever, a weight platform connected to the end of the long arm, a container connected to the end of the short arm, a gate in said container, a second support, a lever pivoted on said second support so as to provide arms of unequal length, means securing the short arm to said gate and means securing the long arm to the long arm of said weight lever at a point so that the distance between this point and the fulcrum of said weight lever is to the length of the short arm of the weight lever as the long arm is to the short arm of said lever.

4. In a charging machine, in combination, a support, a lever fulcrumed to said support to provide a long and short arm, a weight platform secured to said long arm, a container on said short arm in counter-balance relation to said weight lever and platform, a gate in said container serving as a closure for the discharge end of the container, and a lever fastened to said gate and to the long arm of said weight lever.

5. In a charging machine, in combination, a support, a lever fulcrumed to said support to provide a long and short arm, a weight platform secured to said long arm, a container on said short arm in counter-balance relation to said weight lever and platform, a gate in said container, a support on the charging machine, a lever pivoted to said support so as to provide arms of unequal length, the short arm being secured to said gate and the long arm to the long arm of the weight lever.

6. In a charging machine, in combination, a support, a weight lever pivoted on said support so as to provide a lever of the first kind with unequal arms, said support serving as the fulcrum for said weight lever, a weight platform secured to the long arm, a hopper loosely and rotatably mounted on the short arm, a pivoted gate in said hopper, an operating lever for said gate and a lever pivoted on said operating lever so that a short and long arm is provided, the short arm being connected to said pivoted gate and the long arm being secured to the long arm of said weight lever at a point so that the distance between this point and the fulcrum of the weight lever is to the length of the short arm of the weight lever as the length of the long arm of said lever is to the length of the short arm.

7. In a balance, a support, a lever fulcrumed to said support to provide a long and short arm, a weight platform secured to said long arm, a container on said short arm in counter-balance relation to said weight lever and platform, a gate in said container, an operating lever for said gate and a lever pivoted to said operating lever and connected to said gate and to the long arm of said weight lever.

8. In a charging machine, in combination, a support, a lever fulcrumed to said support to provide a long and short arm, a weight platform secured to said long arm, a container on said short arm in counter-balance relation to said weight lever and platform, a gate on said container, an operating lever for said gate, and a lever pivoted to said operating lever so as to provide a long and short arm, the short arm being connected to said gate and the long arm being secured to the long arm of said weight lever at a point so that the distance between this point and the fulcrum of the weight lever is to the length of the short arm of the weight lever as the length of the long arm of said lever is to the length of the short arm.

9. In a balance, a container, a gate in said container arranged to support some of the material in said container, a weight lever in counterbalancing relation with said container, and means connecting said gate and said weight lever to compensate for the weight of material on said gate.

In witness whereof, I hereunto set my hand.

OLAV TWEIT.